A. Clark.
Attaching Teeth to Dental Plates.
No. 86,135. Patented Jan. 26, 1869.
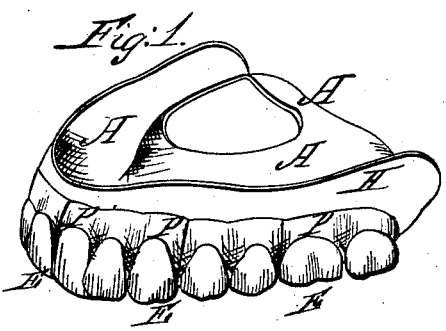
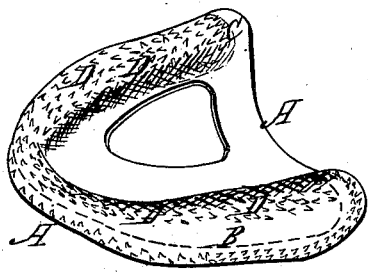
Witnesses.
Inventor:

UNITED STATES PATENT OFFICE.

ALMANZON CLARK, OF GALESBURG, ILLINOIS.

IMPROVED METHOD OF ATTACHING TEETH TO DENTAL PLATES.

Specification forming part of Letters Patent No. 86,135, dated January 26, 1869.

*To all whom it may concern:*

Be it known that I, ALMANZON CLARK, of the city of Galesburg, county of Knox, and State of Illinois, have invented certain new and useful Improvements in the Method of Attaching Artificial Teeth to Dental Plates; and I do hereby declare that the following is a full, clear, and exact description of the same, rerence being had to the accompanying drawings, making a portion of this specification, in which—

Figure 1 is a perspective view of a plate with the teeth attached. Fig. 2 is a perspective view of the plate alone, and represented in an inverted position from that shown at Fig. 1.

Similar letters of reference indicate corresponding parts in both figures.

The nature of this invention relates to attaching artificial teeth to metallic plates; and the invention consists in denticulating or jagging and throwing up small tooth-like projections on the alveolar surface, and near the rim of the plate, whereby the teeth may be secured firmly to the plate by the intervention of the ordinary vulcanized rubber, and without the use of any solder or rivets.

To enable others to understand my improvement, I will proceed to describe it with reference to the drawings.

A represents a metallic plate, either of aluminum, gold, or platinum, swaged in metallic dies and fitted to the mouth. The plate being formed I proceed to fit and adjust the teeth thereon with wax, which being satisfactorily completed, I draw the line B on the plate A, and just below the gums F attached to the teeth. I then, with the plate on the plaster or metallic cast, proceed with a graver or chisel-pointed instrument to jag or denticulate the plate finely and thick from the line B down nearly to the outside rim of the plate A.

For the inside and alveolar surface of the plates I lay on the desired thickness of wax, extending it around to the termination or heel of the plates. I then draw the line C with a pointed instrument to the edge of the wax. I then remove the wax and teeth, and jag or denticulate the plate from the line C up to and under the teeth, extending the operation to the heel or termination of the plate, as shown by dots D in the drawing.

Near the teeth I make the jagging as deep as the plate will bear without cutting through, and as I approach the line C I make the jags finer, closer together, and not so deep, in order to avoid throwing up projections which may extend through the rubber H when the plate is finished.

I now replace the teeth E on the plate with the wax, and articulate and arrange them perfectly, then finish up with wax below the teeth on the outside the thickness desired, and then on the inside down to the line C, and up the teeth and above the platinum pins.

After finishing and smoothing the wax I place the plate and teeth in plaster in the under part of the flask used for vulcanizing teeth set in india-rubber. I fill up with plaster to gums F or edges of the teeth on the outside, being careful not to leave any plaster on the inside of the work. When the plaster becomes dry enough I whittle and scrape it smooth up to the teeth and down to the flask-edge. I now varnish the plaster, then oil it. I then put on the top of the flask and fill with plaster, lay on the cover, and screw down close. When sufficiently dry I warm the flask, remove the screws, give the flask a few gentle taps, then separate it and remove all the wax I can with instruments and bibulous paper. I then put the flask together and boil in clean water from five to ten minutes. I then take the flask apart and pack the rim with rubber. I then pack the inside of the plate under the teeth and around to the heel with the india-rubber, being careful not to use any more rubber than will fill the vacuum caused by the removal of the wax. I now put my flask together, put in the screws lightly, and place in boiling water for from five to ten minutes, then screw down close, and place it in the vulcanizer from seventy-five to eighty minutes—thermometer 310°; then take out, cool off, and finish up the rubber with files, scrapers, pumice, rotten-stone, &c., in the usual manner.

This method is particularly useful in the case of aluminum plates, and allows the use of this desirable metal without the galvanic action in the mouth which occurs when other metals are used as solders or rivets for attaching the teeth to the aluminum.

Having thus described my invention, what I claim as new, and desire to secure by Letters Patent, is—

The within-described rough surface upon a metallic dental plate of aluminum, gold, or platinum near the rim and on the alveolar surface, for the purpose of attaching and securing artificial teeth thereto with any of the different preparations of rubber used for dental purposes, in the manner substantially as described, and for the purpose set forth.

Dated at Galesburg, Illinois, this 18th day of November, 1868.

ALMANZON CLARK.

Witnesses:
J. B. MARSH,
R. R. RICHARDS.